W. V. TURNER.
DUPLEX PRESSURE ELECTRIC PUMP GOVERNOR.
APPLICATION FILED APR. 11, 1911.
1,112,495.
Patented Oct. 6, 1914.
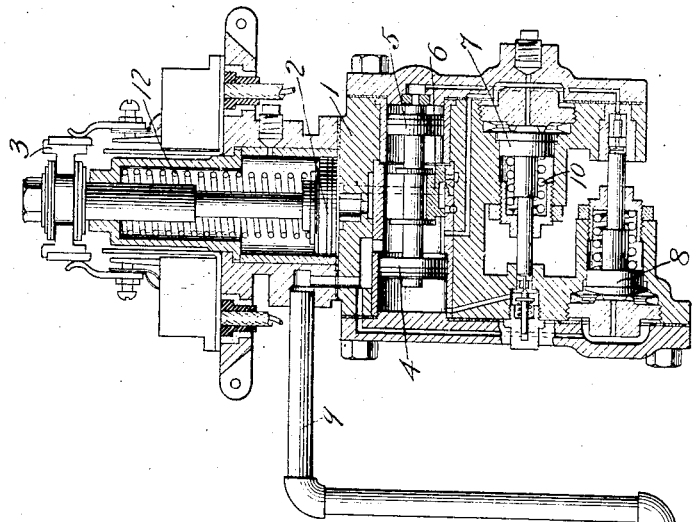
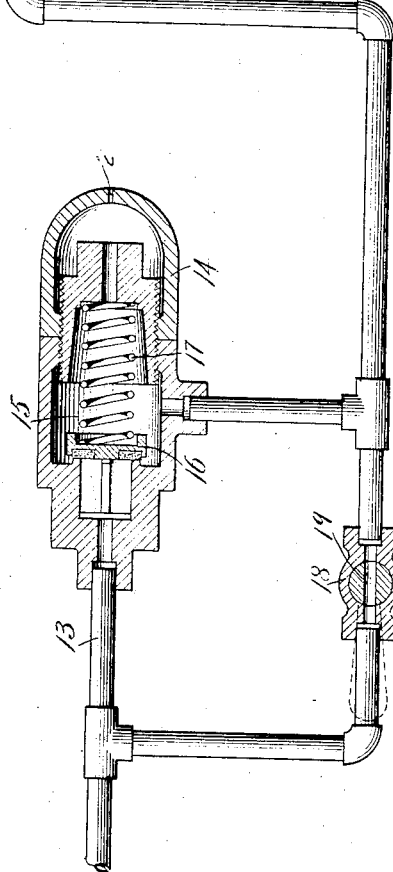
WITNESSES
INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

DUPLEX-PRESSURE ELECTRIC PUMP-GOVERNOR.

1,112,495.  Specification of Letters Patent.  Patented Oct. 6, 1914.

Application filed April 11, 1911. Serial No. 620,471.

*To all whom it may concern:*

Be it known that I, WALTER V. TURNER, a citizen of the United States, residing at Edgewood, in the county of Allegheny and State of Pennsylvania, have invented new and useful Improvements in Duplex-Pressure Electric Pump-Governors, of which the following is a specification.

This invention relates to pump governors, and more particularly to the class of pump governors provided with a valve mechanism adapted when the pump pressure rises to a predetermined maximum degree of pressure to cut the pump out of operation and when the pump pressure falls to a predetermined minimum degree of pressure to cut the pump into operation.

In some classes of service, it is highly desirable to be able to govern the pump according to one maximum and minimum degree of pressure at one time and according to another maximum and minimum degree of pressure at another time, such as, for example, where the equipment is employed both in passenger service, in which a high standard degree of pressure is used, and in freight service, where a lower standard degree of pressure is usually employed.

The principal object of my invention is to provide a pump governor having means for controlling the pump at one time according to one maximum and minimum degree of pump pressure and at another time according to another maximum and minimum degree of pump pressure.

In the accompanying drawing, Figure 1 is a sectional view of an electric pump governor, showing my improvement applied thereto and Fig. 2 a detail sectional view of the controlling cock.

My invention may be employed in connection with various types of governors, but I have shown the same in the drawing as applied to an electric pump governor of what is known as the J type, such as covered in my prior Patent No. 879,699, dated February 18, 1908. This form of governor, as shown in the drawing, comprises, broadly stated, a casing 1, a piston 2 for controlling the pump motor switch 3, a valve 6 for supplying and releasing fluid to and from the piston 2, a double piston device having piston heads 4 and 5 for operating the valve 6, and regulating valve devices 7 and 8 governed by the pump pressure for supplying and releasing fluid to and from the pistons 4 and 5 to thereby operate the valve 6.

Fluid at pump pressure is supplied to the pump governor through pipe 9 from the reservoir or other receptacle into which the pump compresses fluid, and in operation, upon the pump pressure rising to a predetermined maximum degree of pressure, as determined by the spring 10 of the regulating valve device 7, the same operates to vent fluid from piston head 4, thereby causing the valve 6 to be shifted to a position for supplying fluid to the switch actuating piston 2. The piston 2 is thereupon operated to open the switch 3 and stop the pump.

When the pump pressure falls to a predetermined minimum degree of pressure as determined by the adjustment of the spring 11, the regulating valve device 8 operates to vent fluid from the opposite piston head 5 and the valve 6 is then shifted by the double piston device to a position in which fluid is vented from the piston 2. The release of fluid from the piston 2 permits the spring 12 to shift said piston and thereby close the switch 3, thus starting the pump.

According to my improvement, in a branch pipe 13 of the pipe 9 is provided an excess pressure valve device comprising a casing 14 having a valve chamber 15 containing a check valve 16, subject to the pressure of an adjustable spring 17 and adapted to permit flow of air only from the pump reservoir to the governor.

A cock 18 is located in the main branch of the pipe 9, and in one position of the cock, as shown in Fig. 1, fluid may flow directly from the pump reservoir through the port 19 to the pump governor. In the position of the cock 18, as shown in Fig. 2, direct communication is cut off and fluid must flow by way of the excess pressure valve to the governor.

In operation, if the cock is in the position shown in Fig. 1, fluid at reservoir pressure is supplied to the governor and the latter operates in the usual manner according to the maximum and minimum degree of pump pressure. If a higher range of maximum and minimum pressures is desired, the cock is turned to the position shown in Fig. 2, and the spring 17 being adjusted according to the higher degree of pressure required, fluid is only admitted to the governor at a pressure a predetermined degree less than the full pump pressure, so that when the pressure acting on the regulating valve device 7 has increased to the cutting out point, it will be evident that the pressure in the pump reservoir will be a predetermined degree higher and likewise when the pressure on the regulating valve device 8 has become reduced to the operating degree for same, the pump pressure will be higher by the pressure due to the spring 17. For example, suppose the pump governor has the maximum pressure regulating valve device 7 adjusted to operate at 100 pounds and the minimum pressure regulating valve device 8 adjusted to operate at 85 pounds, and suppose that it is also desired to provide higher maximum and minimum pump pressures of 140 and 125 pounds respectively, then the spring 17 is adjusted at 40 pounds, so that the pump will cut out, when the excess pressure valve is cut in, at a pump pressure of 100 pounds plus 40 pounds or 140 pounds and the pump will cut in at a pump pressure of 85 pounds plus 40 pounds or 125 pounds.

A restricted exhaust passage 20 opens into the spring chamber 15, so as to prevent the bottling up of pressure in the pipe 9, and the pressure in said pipe may then be constantly maintained at a predetermined degree less than the pump pressure according to the adjustment of the spring 17, since loss of pressure in the pipe 9 by leakage through passage 20 is compensated for by the opening of the valve 16, when the pressure in said pipe falls below the differential employed.

Having now described my invention, what I claim as new and desire to secure by Letters Patent, is:

1. The combination with a pump governor operating at a predetermined maximum degree of pump pressure for cutting out the pump and at a predetermined minimum degree of pump pressure for cutting in the pump, of means for causing the pump governor to cut the pump into and out of action when the maximum and minimum pump pressures are higher than those for which the governor is adjusted.

2. The combination with a pump governor normally operated according to the degree of pump pressure for cutting the pump into and out of action, of a valve device for supplying fluid to the pump governor at a pressure less than the pump pressure, to thereby cause the governor to cut the pump into and out of action at pump pressures in excess of the pressures for which the governor is adjusted.

3. The combination with a pump governor comprising a movable abutment and a regulating valve mechanism normally operated according to the degree of pump pressure for controlling the admission and release of fluid to and from said abutment to cause the pump to be cut into and out of action, of an excess pressure valve for supplying fluid to operate the pump governor to cut the pump into and out of action at pressures a predetermined degree less than the pump pressure.

4. The combination with a pump governor governed by fluid pressure and adapted at a predetermined maximum degree of pressure to cut the pump out of action and at a predetermined minimum degree of pressure to cut the pump into action, of a valve device for supplying operating fluid to the pump governor at a predetermined degree of pressure less than the pump pressure and a cock having one position in which communication is opened for supplying fluid at pump pressure to the pump governor and another position for closing said communication, so that operating fluid is supplied to the pump governor through said valve device.

5. The combination with a pump governor comprising a movable abutment and a valve mechanism operated by variations in fluid pressure for supplying and releasing fluid to and from said abutment to control the pump, of an excess pressure valve subject to the opposing pressures of an adjustable spring and the pump pressure for also supplying operating fluid to the pump governor at a pressure a predetermined degree less than the pump pressure to thereby cause the pump to be cut in and out at pressures higher than normal.

6. The combination with a pump governor comprising a movable abutment and a valve mechanism operated by variations in fluid pressure for supplying and releasing fluid to and from said abutment to control the pump, of an excess pressure valve device for supply operating fluid to the pump governor at a pressure a predetermined degree less than the pump pressure, said valve device being provided with a restricted exhaust port for preventing the pressure of fluid supplied to the pump governor from exceeding said predetermined degree of pressure.

7. The combination with a pump governor comprising a movable abutment and a valve mechanism operated by variations in fluid pressure for supplying and releasing fluid to and from said abutment to control the pump, of an excess pressure valve device for supplying operating fluid to the pump governor at a pressure a predetermined degree less than the pump pressure, and means for preventing the pressure of fluid supplied to the governor from exceeding the pressure as determined by said valve device.

In testimony whereof I have hereunto set my hand.

WALTER V. TURNER.

Witnesses:
A. M. CLEMENTS,
S. W. KEEFER.